United States Patent [19]

Kawashima

[11] Patent Number: 5,641,999
[45] Date of Patent: Jun. 24, 1997

[54] VEHICLE IGNITION KEY DEVICE FOR REMOTELY DRIVING AN IGNITION ROTARY SWITCH AND FURTHER INCLUDING SPEED DETECTION PRIOR TO DISABLEMENT

[76] Inventor: Yoshinori Kawashima, 1-19-11-201 Hijirigaoka, Tama-shi, Tokyo, Japan

[21] Appl. No.: 576,147

[22] Filed: Dec. 21, 1995

[30] Foreign Application Priority Data

Dec. 27, 1994 [JP] Japan ................................. 6-338254

[51] Int. Cl.$^6$ ........................... B60R 25/00; E05B 65/12
[52] U.S. Cl. .................... 307/10.3; 70/252; 70/279; 123/179.2; 340/825.72
[58] Field of Search .................... 307/10.1–10.6; 180/287; 123/179.2–179.4; 340/825.3–825.32, 825.34, 825.69, 825.72; 70/279, 252, 188, 189, 256

[56] References Cited

U.S. PATENT DOCUMENTS

| | | | |
|---|---|---|---|
| 4,643,009 | 2/1987 | Sato | 70/252 |
| 4,716,748 | 1/1988 | Watanuki et al. | 70/252 |
| 4,827,744 | 5/1989 | Namazue et al. | 70/252 |
| 5,255,547 | 10/1993 | Burr et al. | 70/252 |
| 5,444,430 | 8/1995 | McShane | 340/426 |
| 5,519,255 | 5/1996 | Burtch et al. | 307/10.2 |

*Primary Examiner*—Richard T. Elms
*Attorney, Agent, or Firm*—Keck, Mahin & Cate

[57] ABSTRACT

A vehicle ignition key device directly activates a rotary switch by a rotation-driving mechanism remotely driven by an external control signal for stopping the engine of the vehicle. The device is further useful as a burglar-proof device. A rotary switch can be placed in OFF, ON and START positions by key operation, and a rotation-driving mechanism activates the switch in each of the positions by receiving an externally dispatched signal. Further, this device is constructed for use as the burglar-proof device by being provided with a vehicle speed detector and a mode switch for burglar-proofing.

4 Claims, 5 Drawing Sheets

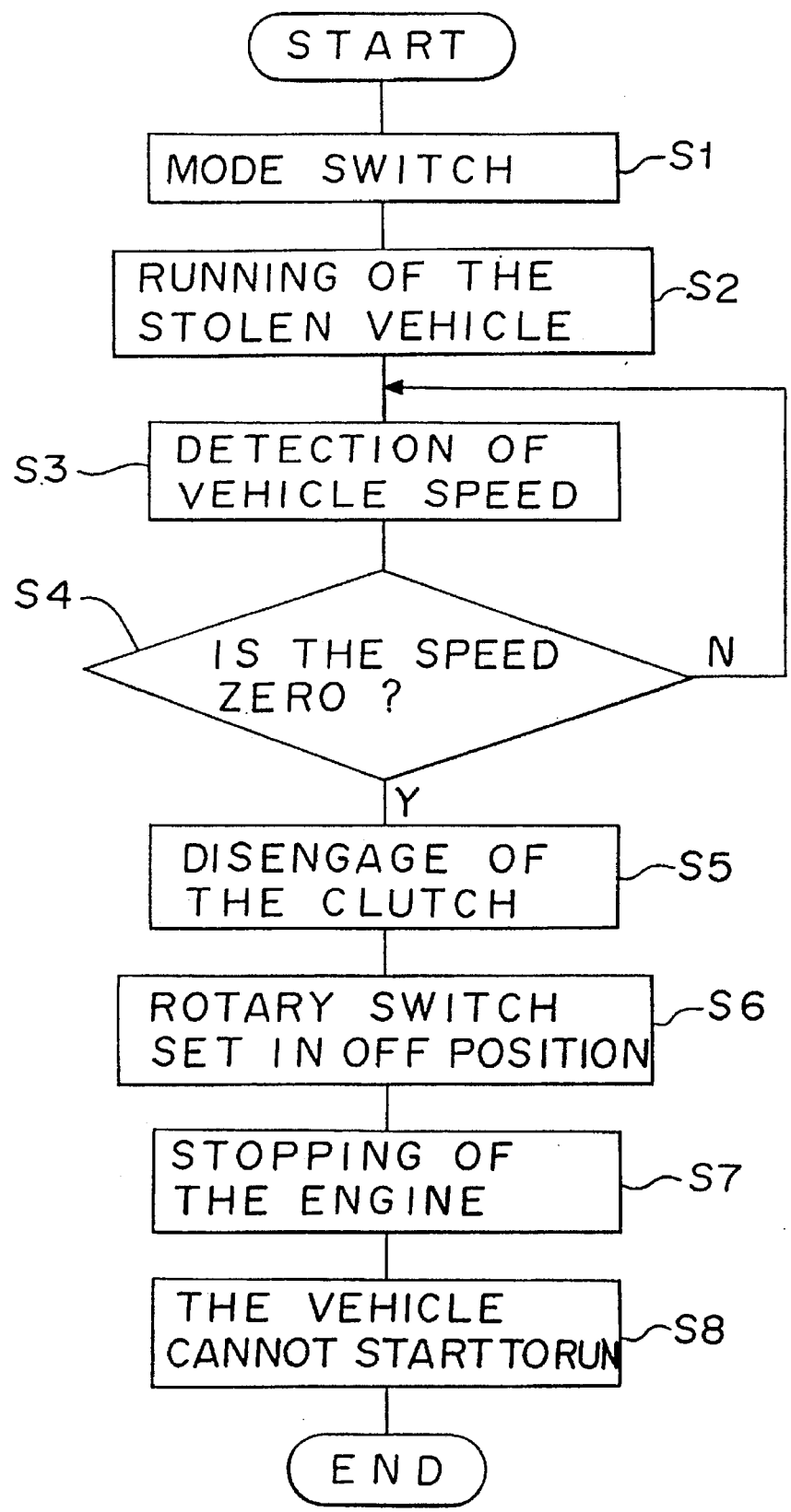

VEHICLE IGNITION KEY DEVICE FOR REMOTELY DRIVING AN IGNITION ROTARY SWITCH AND FURTHER INCLUDING SPEED DETECTION PRIOR TO DISABLEMENT

BACKGROUND OF THE INVENTION

The present invention relates to a vehicle ignition key device for remote starting or stopping of an engine of a vehicle by signals dispatched outside the vehicle, and also relates to a burglar-proof device using the ignition key device.

It is known that engines of vehicles are urged remotely to start or stop with a device in which a receiver is connected in the course of an ignition circuit which is connected to an ignition key device. The receiver receives signals dispatched remotely outside the vehicle, and the ignition circuit is urged to be activated by the signals.

When the prior art device that remotely activates a vehicle engine is installed, in order to connect the receiver, the lead wire composing the ignition circuit is cut some place around half way thereof, and wiring is connected between the cut portions. The wiring is connected to the receiver.

But as this method cuts the existing ignition circuit installed by the car maker and adds a separate wiring, there were occasionally electrical hindrances after the wiring thereof.

The present invention is developed in consideration of the above-mentioned drawback, and one object thereof is to provide an improved vehicle ignition key device, which is capable of remotely starting and stopping a car engine without mistake. The device has no requirement of adding new wiring which may cause an electrical hindrance. The ignition key device comprises having an ignition circuit with a rotation-driving mechanism driven by receiving externally input control signal, and directly driving the rotary switch by applying the mechanism.

Another object of the present invention is to provide a burglar-proof device which is able to effectively prevent vehicular theft by using the above-mentioned ignition key device.

BRIEF DESCRIPTION OF THE INVENTION

In order to attain the above objects, the ignition key device according to the present invention, enabling the engine to start according to the rotation of the rotary switch urged to be driven by the working shaft driven by the rotation of the key, is characterized in that the rotation-driving mechanism rotatably driving the aforementioned rotary switch by control signals externally dispatched, is installed between the working shaft and the rotary switch.

Further, the rotation-driving mechanism is characterized in that it comprises a clutch freely urging the working shaft to connect with the rotating shaft of the rotary switch and a rotation-driving member rotatably driving the rotary switch as much as the specified rotating angle.

Also, it is characterized in that the rotation-driving mechanism and the rotary switch are integrated in one piece.

Further, the burglar-proof device according to the present invention is provided with a receiver for receiving the control signal and controlling the vehicle-ignition device, a mode switch setting the vehicle in the burglar-proof mode, a speed detector detecting vehicle speed, and a controller controlling the vehicle ignition key device in accordance with the control signal controlling the vehicle ignition key device, received and detected by the receiver, a detected signal issued from the speed detector and the set condition of the mode switch. The burglar-proof device is characterized in that the controller controls the vehicle ignition key device and stops the engine of the vehicle, by detecting that the vehicle speed is zero, together with detecting that the mode switch is set at the burglar-proof mode, and detecting that the controller detects the control signal directing the vehicle to be stopped.

Also, the burglar-proof device is comprised of a mode switch setting the vehicle in the burglar-proof mode, a vehicle speed detector for detecting the vehicle speed, and a controller controlling the vehicle ignition key device in accordance with the detecting signal issued from the vehicle speed detector and the set condition of the mode switch. Thereby the burglar-proof device is characterized in that the controller stops the vehicle by controlling the vehicle ignition key device, when the mode switch is set on the burglar-proof mode, and the controller detects that the vehicle speed detected by the speed detector is zero after the vehicle has once run.

In the vehicle ignition key device according to the present invention, the rotation-driving mechanism is installed between the working shaft placed in the key cylinder, driven by key operation and the rotating shaft of the rotary switch, and the receiver which receives the signal driving the rotation-driving mechanism and the controller which receives the signal received by the receiver are provided, and subsequently the engine is started or stopped remotely, as the controller urges the rotation-driving mechanism rotatably to control.

The rotation-driving mechanism is comprised of the clutch having a solenoid driving the clutch and the rotation-driving member rotatively driving the rotary switch, and the mechanism drives the rotary switch by controlling the rotation-driving member, together with driving the solenoid by applying the control signal dispatched from the controller.

Furthermore, as a vehicle-speed detector and a mode switch for preventing vehicle theft are provided, and as the mode switch is set on the burglar-proof position, it becomes possible to automatically stop the engine when the speed of the vehicle becomes zero.

BRIEF DESCRIPTION OF THE DRAWINGS

FIG. 7 is a flow chart explaining the action of the burglar-proof device shown in FIG. 6.

DETAILED DESCRIPTION OF THE INVENTION

Figure 1:
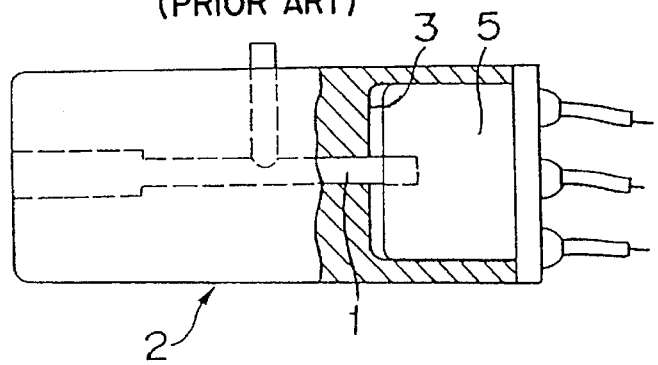
FIG. 1 shows a partially sectional plan view of an ignition key device.

FIG. 1 shows the publicly known vehicle ignition key device installed near the steering shaft, and this device is provided with a key cylinder 2 provided with a working shaft 1 driven by a turning key, and a rotary switch 5 installed in an axial concavity 3 provided after the key cylinder 2, having a (not shown) rotating shaft connected to the end portion of the working shaft 1 intruding in the concavity 3 in a state in which they are engaged together with each other.

In such a vehicle ignition key device, it usually becomes possible to activate an accessory circuit of the vehicle or to start/stop the vehicle engine by rotating the operating shaft 1 in the key cylinder 2 with the key, then by rotating the rotary switch 5 through a specified angle by the operating shaft 1.

Figure 3:
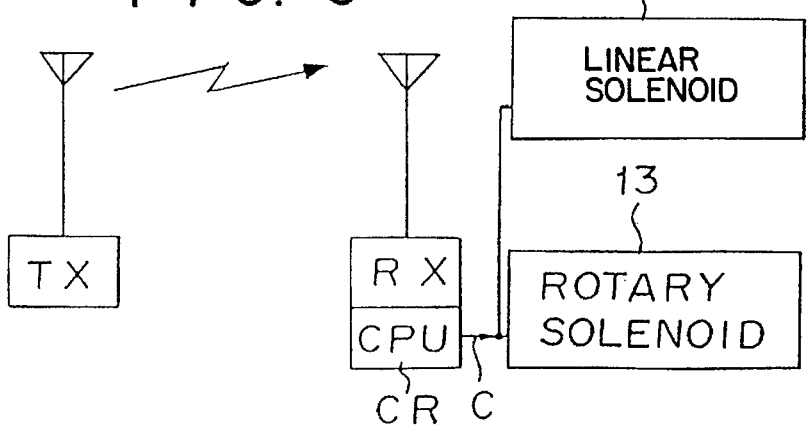
FIG. 3 is an explanatory drawing showing inputting method of externally dispatched signal.

In the present invention, a rotation-driving mechanism A rotatably drives the rotary switch 5 by applying externally dispatched control signal as shown in FIG. 3, between the key cylinder 2 of the ignition key device and the rotary switch 5.

The rotation-driving mechanism A is comprised of a rotary solenoid 13 (equivalent to the aforementioned rotation-driving member) having a rotating shaft 13a rotatably driving the rotary switch 5 by one end of the shaft 13a being inserted into the rotating shaft of the rotary switch 5, and a clutch which connects/disconnects the operating shaft 1 in the key cylinder 2 with the rotating shaft 13a of the rotary solenoid 13, and the clutch 10 and the rotary solenoid 13 are installed in a casing 7.

The clutch 10 is comprised of a clutch plate 8a integrated in one piece with a bearing 8 and another clutch plate 9a which is freely slidable towards the axial direction of the rotating shaft 13a of the rotary solenoid 13 and fixed towards the rotational direction, and the clutch plate 9a is usually biased to engage with the clutch plate 8a by a coil spring 11.

Further, a linear solenoid 12 is provided in the casing 7 for releasing the clutch plate 9a from the clutch plate 8a against the coil spring in case the solenoid is energized.

For attaining this purpose, a semi-circular long hole 9b corresponding to the rotating range of the rotating shaft of the rotary switch 5, is provided in the clutch plate 9a, and a plunger 12a of the linear solenoid 12 driving the clutch 10 is inserted in the long hole 9b. Accordingly, the rotating angle of the rotating shaft 13a of the rotary solenoid 13 is rotatably controlled so as to rotate as much as a specified rotating angle by control signal dispatched from a transmitter (described hereinafter) so as to rotate with the same movement of the original operating angle in itself of the rotating shaft of the rotary switch 5.

Figure 2:
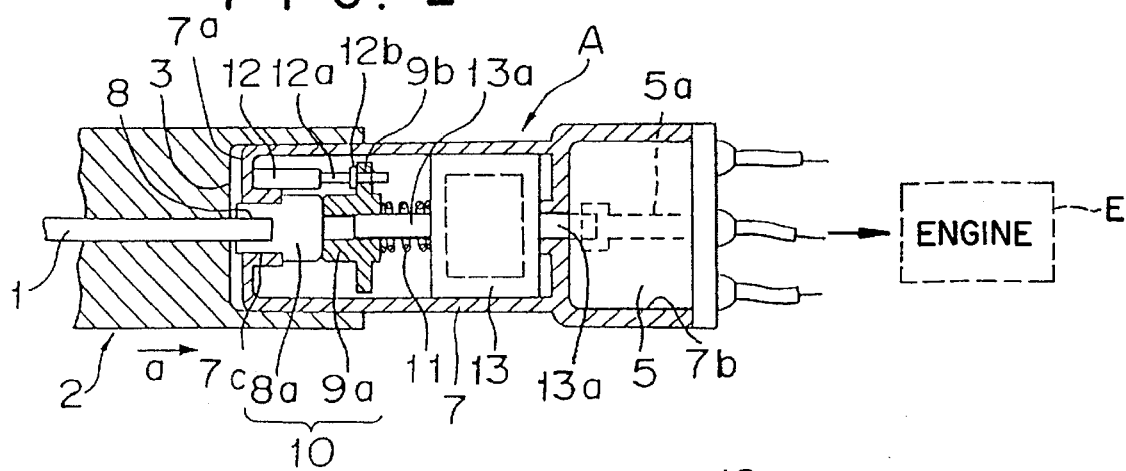
FIG. 2 shows a sectional plan view of the ignition key device shown in FIG. 1 which includes a rotation-driving mechanism.

The casing 7 composing a case of the rotation-driving mechanism A is shaped in a cylindrical shape having a diameter equivalent to the concavity 3 of the key cylinder 2, then for installing the rotation-driving mechanism A between the key cylinder 2 and the rotary switch 5, at first, once by pulling out the rotary switch 5 from the key cylinder 2 shown in FIG. 1, then by inserting the rotary switch 5 provided with the rotation-driving mechanism A shown in FIG. 2 into the concavity 3 provided by pulling out the rotary switch 5, then by connecting the bearing 8 of the clutch plate 8a with the operating shaft 1, and thereafter the installation of the rotation-driving mechanism A into the ignition key device is finished by connecting the rotation-driving mechanism A to the key cylinder 2 by applying any connecting device such as threading.

The process of starting the engine E of the vehicle by applying the rotation-driving mechanism A installed as described above is explained in accordance with FIG. 3.

When an engine-starting signal equivalent to control signal dispatched from a transmitter TX is received by a receiver RX, and the identified signal c in the receiver RX is input into a controller CR, at first the solenoid 12 of the rotation-driving mechanism A is activated, then as a consequence, as the pushing piece 12b of the plunger 12a pushes the clutch plate 9a towards arrow a against the coil spring 11, the engaged condition of the clutch 10 is released.

Then the rotating shaft 13a is rotated intermittently as much as every specified angle, and the rotating shaft of the rotary switch 5 sequentially starts to rotate from the off position to the starting position following the rotation of the rotating shaft 13a, and accordingly the engine starts due to the rotation of the starter.

In addition to the operation above, the clutch plate 9a rotates in one piece with the rotating shaft 13a, but the clutch plate 9a can rotate without hindrance as the plunger 12a is freely inserted in the semi-circular long hole 9b of the clutch plate 9a.

Further, the rotating force is not transmitted to the operating shaft 1 as the clutch 10 is released, and it is then possible to operate the rotary switch 5 when the steering wheel is locked.

Next, in the key operation with the key kept in the driver's hand, such as when starting the engine by inserting the key in the key cylinder 2, as the clutch 10 is already closed, the rotating shaft 13a of the rotary solenoid 13 is able to directly rotate and consequently the rotary switch 5 is able to rotate.

As described above, a vehicle ignition key device is comprised of:

a key cylinder 2 of the vehicle ignition key device;

a concaved portion 3 shaped in the key cylinder 2;

a rotary switch 5 installed in the concaved portion 3 of the key cylinder 2;

a switch 5a of the rotary shaft 5;

a working shaft 1 provided in the key cylinder 2 for rotatively driving the rotary switch 5;

a casing 7 inserted in the concaved portion 3 of the key cylinder 2, after being assembled with the rotary switch 5;

a cylindrical portion 7a provided in one side of the casing 7 and being insertable in the concaved portion 3;

a concaved portion 7b provided in other side of the casing 7 for assembling therein the rotary switch 5;

a clutch plate 8a supported by a supporting portion 7c of the cylindrical portion 7a of the casing 7 which is rotatable together with the working shaft 7;

a rotary solenoid 13 having a shaft 13a assembled in the casing 1 so as being able to rotatably drive the shaft 5a of the rotary switch 5 assembled in the casing 7, with applying external signals c;

a clutch plate 9a axially slidably assembled on the shaft 13a so as faced the clutch plate 8a, and being rotatable together with the shaft 13a;

a coil spring 11 provided on the shaft 13a of the rotary solenoid 13 for biasing the clutch plate 9a against the clutch plate 8a;

a solenoid 12 provided in the casing 7 for releasing the clutch plate 8a from the clutch plate 9a; and a circular-shaped long groove 9b shaped on the clutch plate 9a for letting a plunger 12b of the solenoid 12 to engage with the clutch plate 9a.

In addition to the above-mentioned embodiment, though the plunger 12 is used for closing the clutch 10, it may of course be possible to apply another device.

Next, as the vehicle ignition key device is applicable for the burglar-proof device of the vehicle, the structure of the device is explained with reference to FIG. 4–FIG. 7 as follows.

Figure 4:
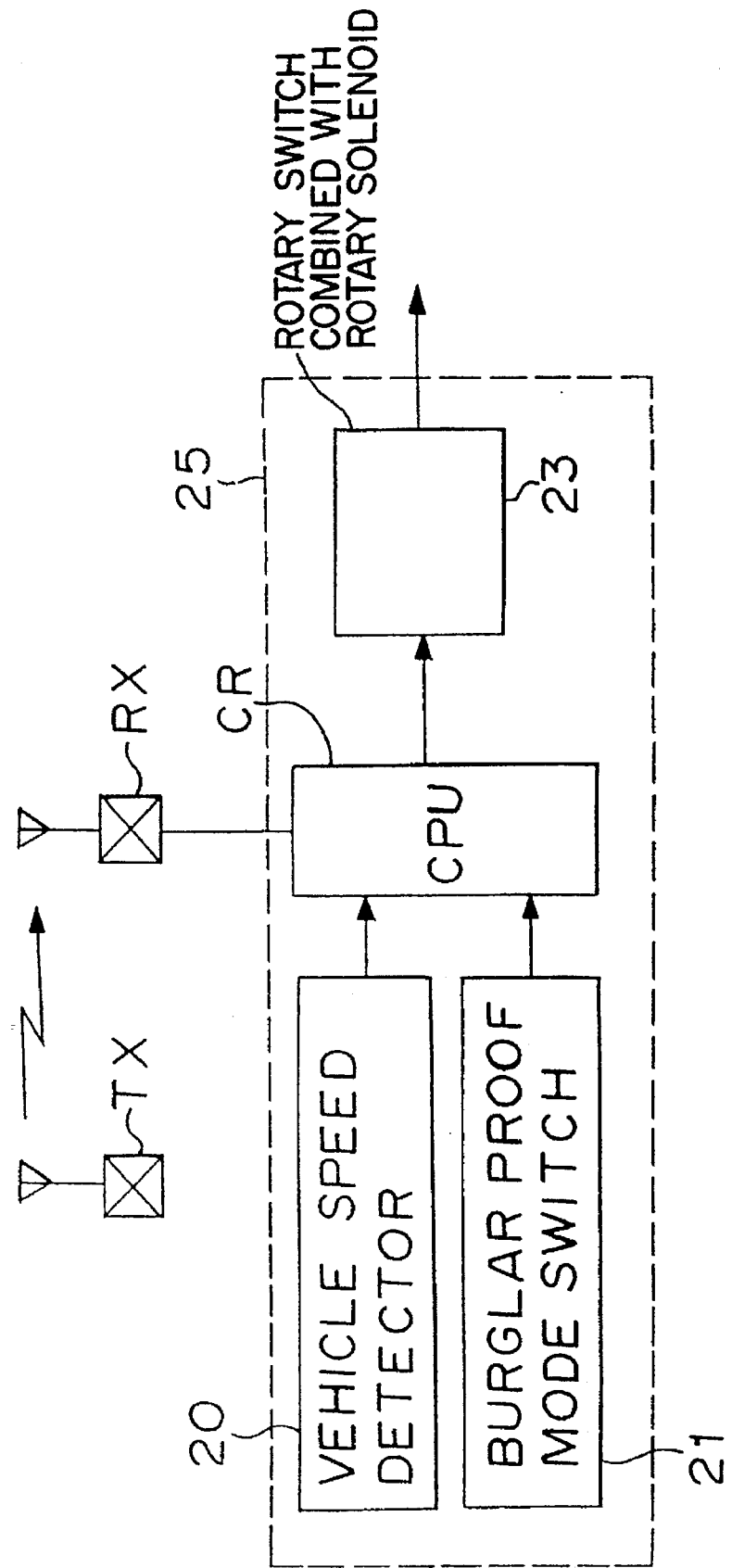
FIG. 4 is a block diagram of the burglar-proof device according to the present invention.
Figure 5:
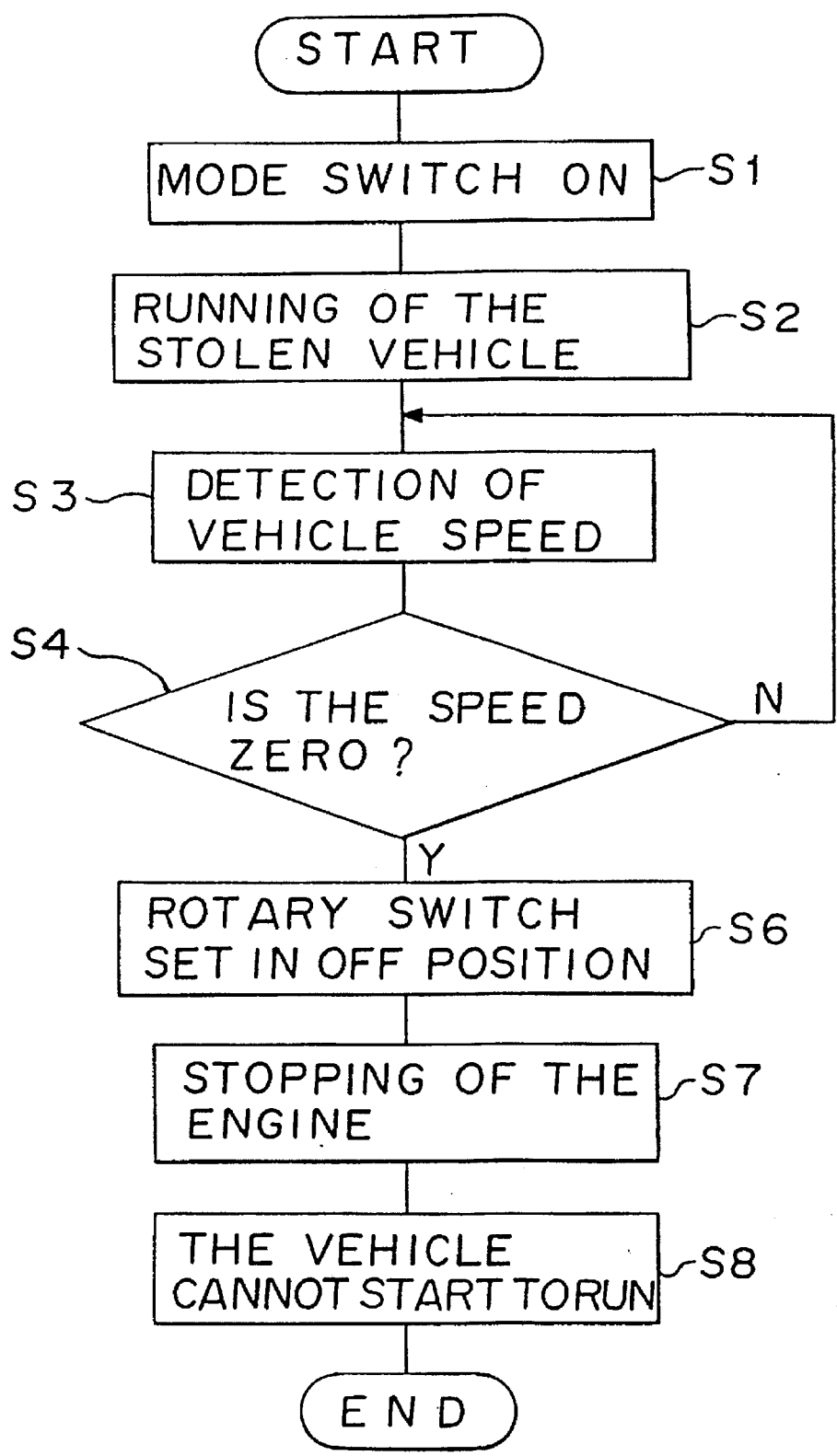
FIG. 5 is a flow chart explaining the action of the burglar-proof device.

FIG. 4 is an embodiment of the burglar-proof device, in which a vehicle speed detector 20 and a mode switch 21 for the burglar-proof device is added to the controller CR, as shown in FIG. 3. The action of the device is explained with reference to the flow chart shown in FIG. 5.

For example, car theft often occurs when the vehicle is left unattended for a short period of time, e.g., while making a telephone call or shopping, often with the key remaining in the ignition. In this case, the driver leaves the vehicle after setting the aforementioned mode switch to the burglar-proof mode (step 1). When the stolen vehicle starts to run while the driver is absent (step 2), the driver or the vehicle owner operates the transmitter TX so as to dispatch the signal ordering the vehicle to stop. No sooner than the signal is received, the controller CR provided in the vehicle detects that the mode switch 21 is set to the burglar-proof mode, and detects the present running speed of the vehicle by the speed detector 20 (step 3).

When the stolen vehicle stops at a red light, and the speed detector 20 detects zero speed of the vehicle (step 4), the controller CR releases the clutch 10 by controlling the clutch driving solenoid 12 (step 5) and instantaneously sets the rotating shaft of the rotary switch 10 to the off position by controlling the rotary solenoid 13 (step 6). Consequently, the engine of the stolen vehicle is stopped at the stop signal (step 7). Accordingly, as the stolen vehicle remains in a stopped condition and can no longer run (step 8), it becomes possible to prevent vehicle theft.

Further, the burglar-proof mode switch 21 is a concealed switch and is installed at a place in the car so as not to be manipulated by any person other than a specified person.

Figure 6:
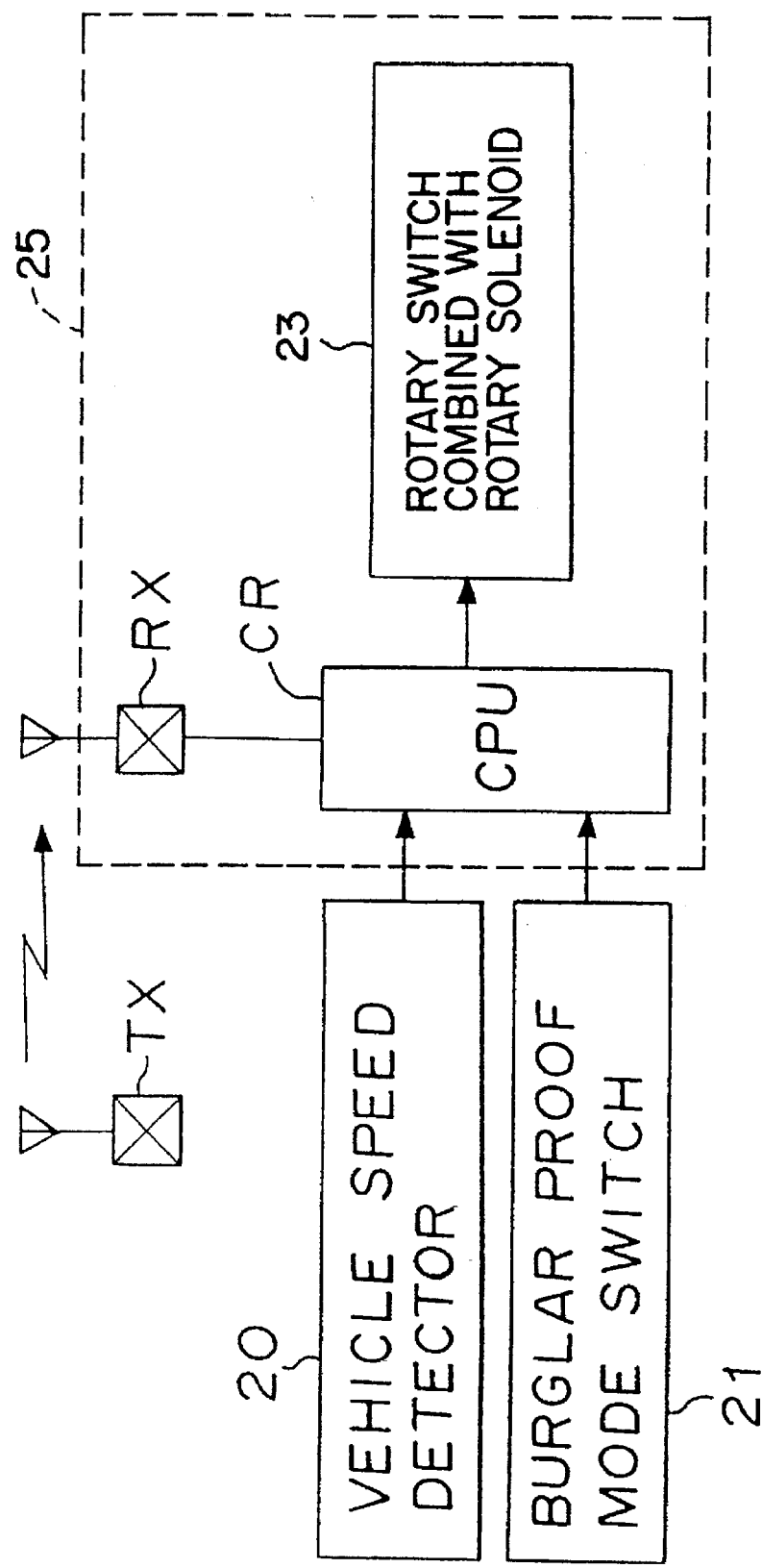
FIG. 6 is a block diagram showing another embodiment of the burglar-proof device.

FIG. 6 shows another embodiment of the burglar-proof device applying the vehicle ignition key device according to the present invention.

In FIG. 6, numeral 23 is a rotary switch combined with the rotary solenoid, and is controllable by receiving the external dispatched control signal. Numeral 25 is a control unit comprised of the rotary switch 23 provided with the rotary solenoid, the receiver RX and the controller CR, and this control unit 25 is installed in an engine room or trunk room in which the externally dispatched control signal is receivable without trouble.

The vehicle ignition key device shown in FIG. 6 is able to remotely start the engine by rotatably controlling the rotary switch 23 provided with the rotary solenoid by applying the controller CR, by receiving the externally dispatched controlling signal with the receiver RX, for remotely driving the engine and performing warm-up running by the control signal (start signal) dispatched externally from the transmitter TX.

Further, in applying the burglar-proof device shown in FIG. 6, when the driver leaves the vehicle with the engine running for a short time during shopping or making a telephone call, the burglar-proof switch 21 is set to the burglar-proof mode. In this mode, no sooner than the controller CR detects that the speed of the stolen vehicle has reached zero after the vehicle has once run, then it becomes possible to stop the engine of the stolen vehicle, as the controller CR turns the rotary switch 23 provided with the rotary solenoid to the off position, and accordingly the stolen vehicle can no longer run.

Yet, as the rotary solenoid 13 in the rotation-driving mechanism A is used as an example for constructing the present invention, it may be possible to use another rotation-driving mechanism having the same function displacing the rotary solenoid 13, and it is of course possible to apply many design changes in ranges that do not deviate from the intent of the present invention.

Further, in the embodiment of the present invention, though the rotation-driving mechanism and the rotary switch were integrated in one piece, it is possible to separate them from each other.

As described above in detail, by applying the present invention, it becomes possible to obtain the following merits:

Because the rotary switch essentially provided in the ignition key device itself is directly operated by combining the rotation-driving mechanism controlled with the externally dispatched control signal with the ignition key device itself, it becomes possible to remotely start and/or stop the engine safely and without mishap, by eliminating perfectly the cutting of the electrical wiring and the addition of new wiring causing the electrical hindrances.

What is claimed is:

1. A vehicle ignition key device compelling an engine to start by driving a rotary switch in accordance with compelling a key-driving shaft of the ignition key device and comprising a rotation-driving mechanism, rotatably driving said rotary switch by receiving an externally dispatched control signal, installed between said key-driving shaft and said rotary switch.

2. The vehicle ignition key device as recited in claim 1, wherein said rotation-driving mechanism comprises:

a clutch freely engaging and releasing said key-driving shaft driven by said ignition key device with a rotating shaft of said rotary switch; and a rotation-driving member rotating said rotary switch through a specified angle while said clutch is released.

3. The vehicle ignition key device as recited in claim 1, wherein said rotation-driving mechanism is integrated in one piece with said rotary switch.

4. The vehicle ignition key device as recited in claim 2, wherein said rotation-driving mechanism is integrated in one piece with said rotary switch.

* * * * *